(12) United States Patent
Maeyama et al.

(10) Patent No.: US 9,346,474 B2
(45) Date of Patent: May 24, 2016

(54) VEHICLE AND TRAVEL DEVICE FOR SAME

(75) Inventors: Hiroyuki Maeyama, Tokyo (JP);
Hiromichi Yamamoto, Tokyo (JP);
Kousuke Katahira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 83 days.

(21) Appl. No.: 13/812,630

(22) PCT Filed: Sep. 7, 2011

(86) PCT No.: PCT/JP2011/070394
§ 371 (c)(1),
(2), (4) Date: Jan. 28, 2013

(87) PCT Pub. No.: WO2012/081286
PCT Pub. Date: Jun. 21, 2012

(65) Prior Publication Data
US 2013/0118375 A1 May 16, 2013

(30) Foreign Application Priority Data

Dec. 17, 2010 (JP) .................................. 2010-281732

(51) Int. Cl.
*B61F 5/26* (2006.01)
*B61F 5/02* (2006.01)
(Continued)

(52) U.S. Cl.
CPC ... *B61F 5/26* (2013.01); *B61F 5/02* (2013.01); *B61F 5/325* (2013.01); *B61F 9/00* (2013.01); *B62D 1/265* (2013.01); *B61F 5/50* (2013.01)

(58) Field of Classification Search
CPC ................ B61F 9/00; B61F 5/02; B61F 5/26; B61F 5/30; B61F 5/32; B61F 5/325; B61F 5/36; B61F 5/50
USPC .................................. 105/218.1, 182.1, 215.1
See application file for complete search history.

(56) References Cited

U.S. PATENT DOCUMENTS 6,308,640 B1 10/2001 Weule et al.
8,667,901 B2 * 3/2014 Maeyama et al. .......... 105/215.2
(Continued)

FOREIGN PATENT DOCUMENTS

CN 1247511 3/2000
FR 2 675 105 10/1992
(Continued)

OTHER PUBLICATIONS

International Search Report issued Oct. 25, 2011 in International (PCT) Application No. PCT/JP2011/070394.
(Continued)

*Primary Examiner* — Zachary Kuhfuss
(74) *Attorney, Agent, or Firm* — Wenderoth, Lind & Ponack, L.L.P.

(57) ABSTRACT

A travel device includes a bogie frame (11) configured to support an axle (5) to which a wheel (3) is attached, a suspension frame (15) disposed close to a center of a vehicle body (1) with respect to the bogie frame (11) and having a support section (16) extending downward from the vehicle body (1), and an upper link (14a) and a lower link (14b) configured to connect the support section (16) and the bogie frame (11) to relatively move the bogie frame (11) with respect to the support section (16) in a vertical direction. In the lower link (14b), a position (11b) at which the lower link (14b) and the bogie frame (11) are connected by pin coupling is disposed lower than a position (15b) at which the lower link (14b) and the support section (16) are connected by pin coupling. In addition, even in the upper link (14a), similar to the lower link, a position (11a) at which the upper link (14a) and the bogie frame (11) are connected by pin coupling is disposed lower than a position (15a) at which the upper link (14a) and the support section (16) are connected by pin coupling. Thus, the lower link (14b) and the upper link (14a) are installed parallel to each other.

4 Claims, 5 Drawing Sheets

(51) Int. Cl.
B61F 5/32 (2006.01)
B61F 9/00 (2006.01)
B62D 1/26 (2006.01)
*B61F 5/50* (2006.01)

(56) References Cited

U.S. PATENT DOCUMENTS

2012/0017800 A1* 1/2012 Kurahashi et al. ......... 105/182.1
2012/0097065 A1* 4/2012 Maeyama et al. ............ 105/177

FOREIGN PATENT DOCUMENTS

| JP | 49-60416 | 5/1974 |
| JP | 53-23416 | 3/1978 |
| JP | 59-11955 | 1/1984 |
| JP | 61-6061 | 1/1986 |
| JP | 63-305072 | 12/1988 |
| JP | 08-085317 | 4/1996 |
| JP | 11-139304 | 5/1999 |
| JP | 11-321635 | 11/1999 |
| JP | 2006-290100 | 10/2006 |
| JP | 2010-188958 | 9/2010 |
| JP | 2010-188971 | 9/2010 |
| JP | 2010-215120 | 9/2010 |

OTHER PUBLICATIONS

Written Opinion of the International Searching Authority issued Oct. 25, 2011 in International (PCT) Application No. PCT/JP2011/070394.

Chinese Office Action issued Sep. 2, 2014 in corresponding Chinese Patent Application No. 201180037276.1 with partial English translation.

* cited by examiner

VEHICLE AND TRAVEL DEVICE FOR SAME

TECHNICAL FIELD

The present invention relates to travel devices disposed at a front side and a rear side of a lower portion of a vehicle body, and a vehicle including the travel devices.

Priority is claimed on Japanese Patent Application No. 2010-281732 filed on Dec. 17, 2010, the contents of which is incorporated herein by reference.

BACKGROUND ART

In recent times, new transportation systems have been receiving attention as new transportation means other than buses and railroads. As one such new transportation system (an automated people mover or an automated transit system), a transportation system in which a vehicle having wheels formed of rubber tires runs on a track is well known.

A travel device of a vehicle having wheels formed of rubber tires is disclosed in, for example, the following Patent Document 1. The travel device of the vehicle disclosed in Patent Document 1 includes a pair of running tires, an axle configured to connect the pair of running tires, an axle support configured to support the axle, a suspension frame disposed at a front side or a rear side of the axle support and having a support section extending downward, upper and lower links configured to connect the support section of the suspension frame and the axle support, and an air suspension disposed between the vehicle body and the axle support.

The upper link and the lower link extend in parallel to each other in a horizontal direction, one ends of the links are connected to the support section of the suspension frame by pin coupling, and the other ends of the links are connected to the axle support by pin coupling.

In the travel device, a four-link parallel mechanism is constituted by the support section of the suspension frame, the axle support, the upper link and the lower link. Here, the axle support is relatively and vertically movably supported with respect to the suspension frame and the vehicle body, to which the suspension frame is attached, by the four-link parallel mechanism. In addition, in the travel device, vertical movement of the axle support according to vertical movement of the running tire and the axle due to the irregularity of a running road surface R are absorbed by the air suspension.

In addition, both of the upper link and the lower link extend in the horizontal direction when a vehicle is stopped in a state in which no passenger is present. Meanwhile, during running, when the vehicle enters the irregularity of the running road surface R, the axle support moves vertically according to vertical movement of the running tire and the axle. As a result, the upper link and the lower link are slightly inclined with respect to the horizontal direction. However, the inclination angle is about 0.5°, which means that the links substantially extend in the horizontal direction.

CITATION LIST

Patent Document

[Patent Document 1] Japanese Unexamined Patent Application, First Publication No. 2010-188958

SUMMARY OF INVENTION

Problems to be Solved by Invention

In general, when the vehicle accelerates or decelerates, an inertial force in a direction opposite to a direction of acceleration and deceleration is applied to the vehicle body, and a moment is generated to rotate the vehicle body with reference to a shaft extending in a vehicle width direction due to the inertial force. For this reason, the vehicle body is inclined in a forward and rearward direction upon acceleration and deceleration. For example, in the vehicle disclosed in Patent Document 1, upon acceleration, a front portion of the vehicle body is raised upward and the air suspension of the front side travel device is expanded in a vertical direction, and a rear portion of the vehicle body is lowered and the air suspension of the rear side travel device is contracted in the vertical direction. Conversely, upon deceleration, the front portion of the vehicle body is lowered, and the rear portion of the vehicle body is raised.

As described above, when the vehicle body is inclined upon acceleration and deceleration, a component of the force of gravity in addition to the acceleration is also applied to a passenger. For this reason, the passenger feels acceleration larger than the actual acceleration, and thus the passenger (in particular, a standing passenger) feels a worse ride quality than the actual acceleration during acceleration and deceleration.

That is, in the travel device disclosed in Patent Document 1, the vehicle body is inclined in a forward and rearward direction during acceleration and deceleration, and the ride quality is not good.

Here, an object of the present invention is to provide a vehicle capable of suppressing inclination of a vehicle body during acceleration and deceleration and improving a ride quality during acceleration and deceleration, and a travel device for the same.

Means for Solving the Problems

According to a travel device of a vehicle according to a first aspect of the present invention, the travel device of the vehicle disposed at a front side and a rear side of a lower portion of a vehicle body includes:

an axle support configured to support an axle to which wheels are attached; a suspension frame having a hanging section disposed close to a center of the vehicle body with reference to the axle support and extending downward from the vehicle body; and a link configured to connect the hanging section and the axle support and in which the axle support is movable with respect to the hanging section in a vertical direction.

The link has a lower link configured to be connected to the hanging section and the axle support by pin coupling, and an upper link disposed over the lower link and configured to be connected to the hanging section and the axle support by pin coupling. In addition, in the lower link, a pin coupling position between the lower link and the axle support is disposed lower than a pin coupling position between the lower link and the support section of the suspension frame in the vertical direction. Further, when a distance in the vertical direction from the pin coupling position between the lower link and the hanging section to the pin coupling position between the lower link and the axle support is a vertical reference distance, in the upper link, a pin coupling position between the upper link and the axle support is disposed lower than a pin coupling position between the upper link and the hanging section of the suspension frame in the vertical direction within a range of the vertical reference distance, and inclination angles of the upper link and the lower link with respect to a horizontal direction are 5° or more and 15° or less.

As described above, when the links are installed, a component of force in a vertical direction is generated to the force applied to the links by a reactive force applied to the ground section of the wheel during acceleration and deceleration. The component of force is applied to the vehicle body as a moment in the traverse direction with respect to an inertial moment for inclining the vehicle body in the forward and rearward direction during acceleration and deceleration. For this reason, according to the travel device, inclination of the vehicle body in the forward and rearward direction during acceleration and deceleration can be suppressed.

Here, in the travel device of the vehicle according to the first aspect of the present invention, the pin coupling position between the upper link and the axle support is disposed lower than the pin coupling position between the upper link and the support section of the suspension frame in the vertical direction at the vertical reference distance.

In addition, in the travel device of the vehicle, the pin coupling position between the upper link and the axle support are connected by pin coupling is disposed at the same level of the pin coupling position between the upper link and the support section of the suspension frame in the vertical direction.

A vehicle according to a second aspect of the present invention includes the vehicle body, the travel device disposed at a front side lower portion of the vehicle body, and the travel device disposed at a rear side lower portion of the vehicle body.

Effects of Invention

In the present invention, the component of force in the vertical direction is generated to the force applied to the respective links by the reactive force applied to the ground section of the wheel during acceleration and deceleration. The component of force is applied to the vehicle body as the moment in the reverse direction with respect to the inertial moment in which the vehicle body is inclined in the forward and rearward direction during acceleration and deceleration.

Therefore, according to the vehicle of the present invention, the inclination of the vehicle body in the forward and rearward direction during acceleration and deceleration can be suppressed, and the ride quality can be improved.

MODES FOR CARRYING OUT INVENTION

Hereinafter, various embodiments of a travel device of a vehicle according to the present invention will be described with reference to the accompanying drawings.

First Embodiment

First, a first embodiment of the travel device of the vehicle according to the present invention will be described with reference to FIG. 1 to FIG. 4B.

Figure 1:
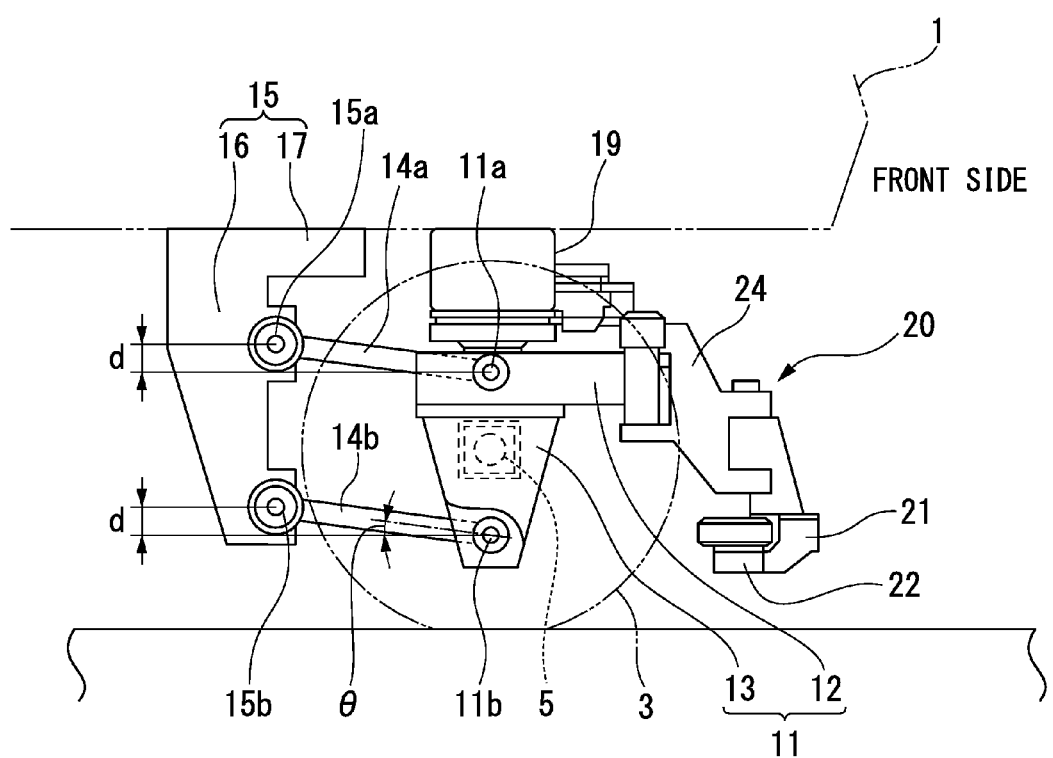
FIG. 1 is a side view of a travel device according to a first embodiment of the present invention.
Figure 2:
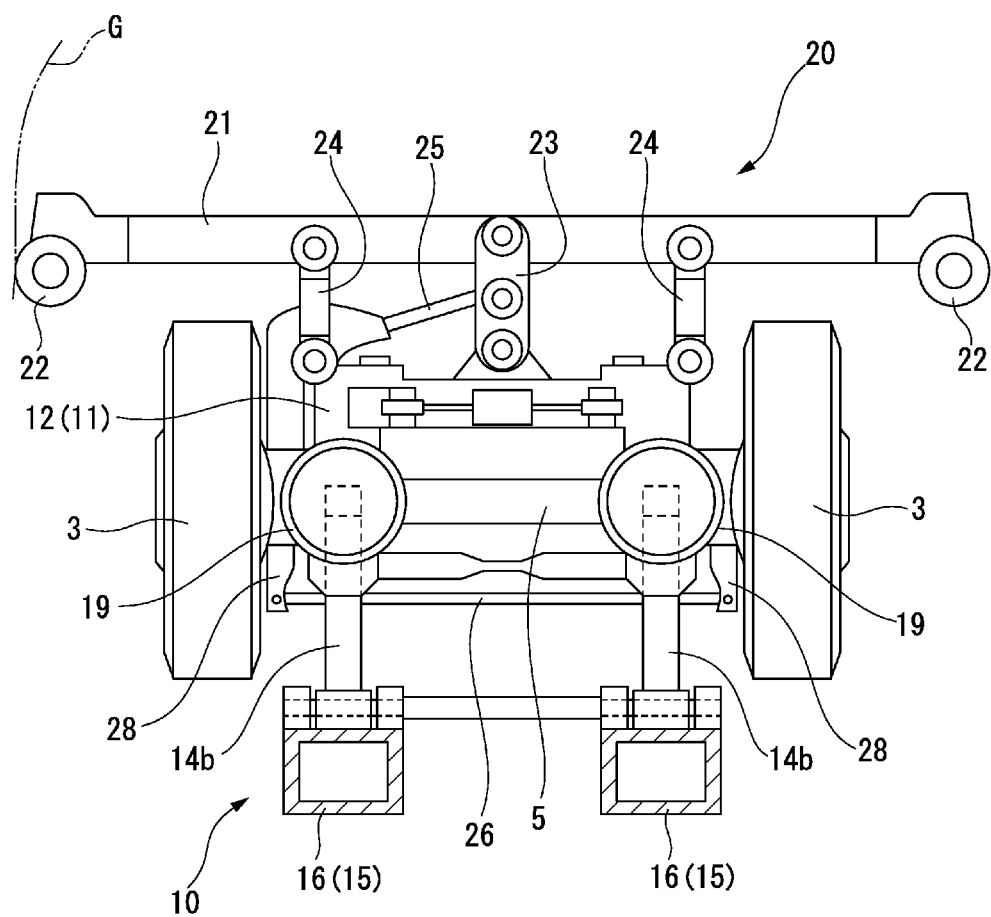
FIG. 2 is a plan view of the travel device according to the first embodiment of the present invention.

The vehicle of the embodiment is a vehicle of a side guide track-type new transportation system. The vehicle includes a vehicle body 1 and a travel device. As shown in FIG. 1 and FIG. 2, the travel device includes a pair of left and right running tires 3, an axle 5 configured to connect the pair of running tires (wheels) 3, a suspension device 10 configured to support the axle 5 and the pair of running tires 3, and a steering guide device 20 configured to direct the running tire 3 in a direction along side guide tracks G installed at both sides of the vehicle.

The suspension device 10 includes a bogie frame (an axle support) 11 configured to support the axle 5, a pair of left and right air suspensions 19 disposed between the bogie frame 11 and the vehicle body 1, and a plurality of links 14a and 14b and a pair of left and right suspension frames 15 configured to variably support the bogie frame 11 in a vertical direction.

The bogie frame 11 has a main body 12 forming a U shape when seen from a plan view. Support sections hanging downward from both arm sections of the main body 12 constitute an axle bearing 13. The axle 5 is attached to the axle bearing 13 of the bogie frame 11. Each of the pair of left and right suspension frames 15 has a support section 16 installed at a rear side of the axle bearing 13 and extending downward, and an attachment section 17 extending from an upper end of the support section 16 toward the front of the vehicle.

The support section 16 of the suspension frame 15, the carriage frame main body 12 and the axle bearing 13 are connected by an upper link 14a and a lower link 14b, which are vertically disposed and parallel to each other. One ends of the links 14a and 14b are connected to the support section 16 of the suspension frame 15 by pin coupling, and the other ends of the links 14a and 14b are connected to the carriage frame main body 12 and the axle bearing 13 by pin coupling.

A position 11b where the lower link 14b and the axle bearing 13 are connected by pin coupling is disposed lower in the vertical direction than a position 15b where the lower link 14b and the support section 16 of the suspension frame 15 are connected by pin coupling. Here, a distance from the position 11b where the lower link 14b and the axle bearing 13 are connected by pin coupling to the position 15b where the lower link 14b and the support section 16 are connected by pin coupling in the vertical direction is referred to as a vertical reference distance d. In this case, a position 11a where the upper link 14a and the bogie frame main body 12 are connected by pin coupling is disposed at a position spaced the vertical reference distance d downward from a position 15a where the upper link 14a and the support section 16 are connected by pin coupling in the vertical direction.

That is, both of the upper link 14a and the lower link 14b are installed such that the position 11a where the upper link 14a and the bogie frame main body 12 are connected by pin coupling is disposed lower than the position 15a where the upper link 14a and the support section 16 of the suspension frame 15 are connected by pin coupling, and the position 11b where the lower link 14b and the axle bearing 13 are connected by pin coupling is disposed lower than the position 15b where the lower link 14b and the support section 16 of the suspension frame 15 are connected by pin coupling, being inclined and parallel to each other in the forward and rearward direction.

In the embodiment, the support section 16 of the suspension frame 15, the bogie frame main body 12 and the axle bearing 13, and the two links 14a and 14b constitute a four-link parallel mechanism. For this reason, the bogie frame main body 12 and the axle bearing 13 can move the vertical direction without varying a direction with respect to the support section 16 of the suspension frame 15. In addition, the two links 14a and 14b function as a traction rod configured to transmit a driving force or a decelerating force of the running tire 3 to the vehicle body 1.

The air suspension 19 is installed between the bogie frame main body 12 and the vehicle body 1. As the air suspension 19 is installed, relative upward/downward vibrations of the running tire 3 and the axle 5 with respect to the vehicle body 1 are decreased.

The steering guide device 20 includes a king pin (not shown) constituting a steering shaft of the running tire 3, a steering arm 28 configured to integrally swing with the running tire 3 with reference to the king pin, a guide transverse beam 21 extending in a width direction of the vehicle body 1 and disposed at a front side of the suspension system 10, the guide wheels 22 installed at both ends of the guide transverse beam 21, a forward/rearward movement switching unit 23 and a turning arm 24 configured to connect the guide transverse beam 21 to the main body 12 of the bogie frame 11 to be capable of displacing in the width direction of the vehicle body 1, a connecting rod 25 configured to connect one end of the steering arm 28 of one of the pair of left and right running tires 3 to the forward/rearward movement switching unit 23, and a tie rod 26 configured to connect the other end of the steering arm 28 of the one running tire 3 to an end of the steering arm 28 of the other running tire 3.

One end of the connecting rod 25 is connected to the forward/rearward movement switching unit 23 by pin coupling, and the other end of the connecting rod 25 is connected to one end of the steering arm 28 of one of the pair of left and right running tires 3 by pin coupling. In addition, both ends of the tie rod 26 are connected to ends of the steering arms 28 of the pair of running tires 3 by pin coupling.

When the guide wheel 22 of the steering guide device 20 comes in contact with the side guide tracks G to receive a load in a transverse direction from the side guide tracks G, the guide transverse beam 21 is displaced in a vehicle width direction of the vehicle body 1. The displacement in the vehicle width direction of the guide transverse beam 21 is transmitted to the steering arm 28 of the one running tire 3 via the forward/rearward movement switching unit 23 and the connecting rod 25. Then, the one running tire 3 and the steering arm 28 swing with reference to the king pin. In addition, swing of the steering arm 28 of the one running tire 3 is transmitted to the steering arm 28 of the other running tire 3 via the tie rod 26. Then, the other running tire 3 and the steering arm 28 also swing with reference to the king pin, same as the one running tire 3.

Figure 3A:
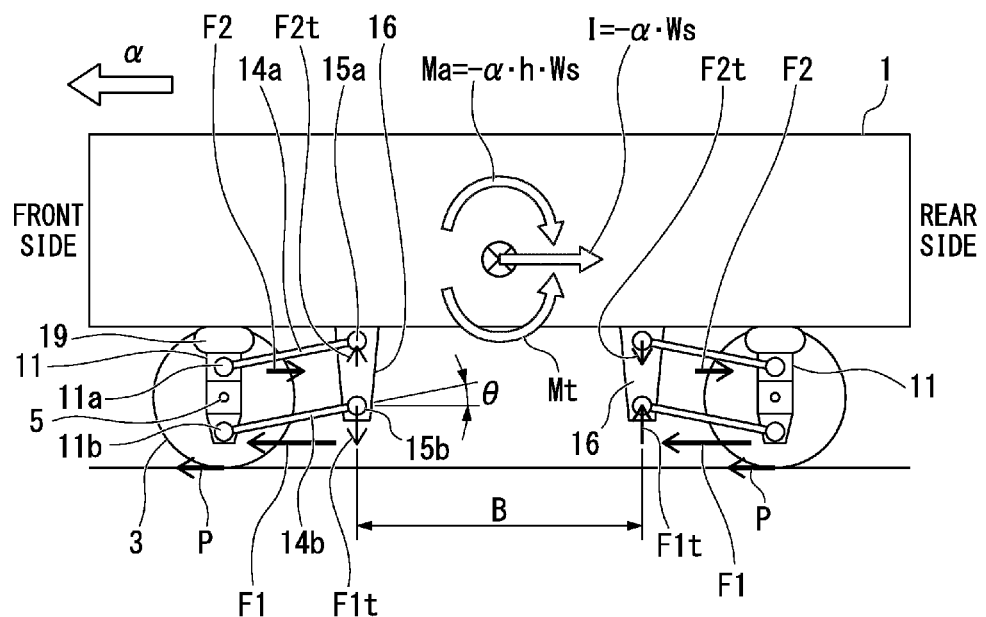
FIG. 3A is a view for describing a force and a moment applied to the respective parts of a vehicle during acceleration of the vehicle according to the first embodiment of the present invention.
Figure 3B:
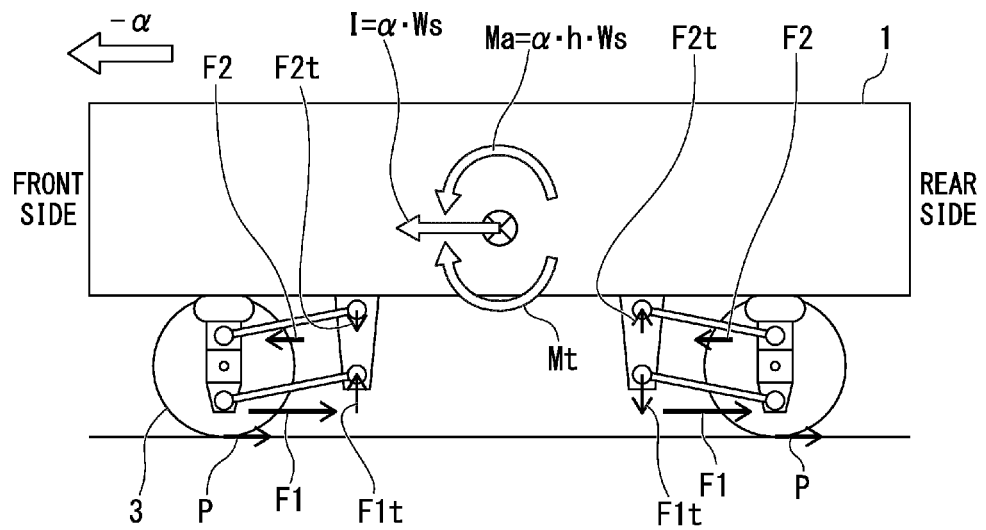
FIG. 3B is a view for describing a force and a moment applied to the respective parts of the vehicle during deceleration of the vehicle according to the first embodiment of the present invention.

In addition, both of FIG. 1 and FIG. 2 show the travel device of the front side of the vehicle, and as shown in FIG. 3A and FIG. 3B, the travel device of the rear side of the vehicle is reversed with respect to the travel device of the front side in the forward and rearward direction.

For this reason, in the travel device of the front side of the vehicle, for example, while the hanging section 16 of the suspension frame 15 is disposed at the rear side of the axle bearing 13 of the bogie frame 11, in the travel device of the rear side, the hanging section 16 of the suspension frame 15 is disposed at the front side of the axle bearing 13 of the bogie frame 11. In addition, in the travel device of the front side, both of the upper link 14a and the lower link 14b have the pin coupling positions 11a and 11b of the front side disposed lower than the pin coupling positions 15a and 15b of the rear side, and in the travel device of the rear side, the upper link and the lower link have the pin coupling positions 11a and 11b of the rear side disposed lower than the pin coupling positions 15a and 15b of the front side.

Accordingly, in the embodiment, in both the travel device of the front side and the travel device of the rear side, the upper link 14a is inclined at an inclination angle $\theta$ such that the position 11a at which the upper link 14a and the bogie frame main body 12 are connected by pin coupling is lower than the position 15a at which the upper link 14a and the suspension frame 15 are connected by pin coupling. In addition, the lower link 14b is also inclined at the inclination angle $\theta$ such that the position 11b at which the lower link 14b and the axle bearing 13 are connected by pin coupling is lower than the position 15b at which the lower link 14b and the suspension frame 15 are connected by pin coupling. Further, both of the inclination angles $\theta$ of the upper link 14a and the lower link 14b are values when the vehicle is in a stop state with no passenger.

Next, an inertial moment applied to the vehicle body during acceleration and deceleration will be described.

Figure 4A:
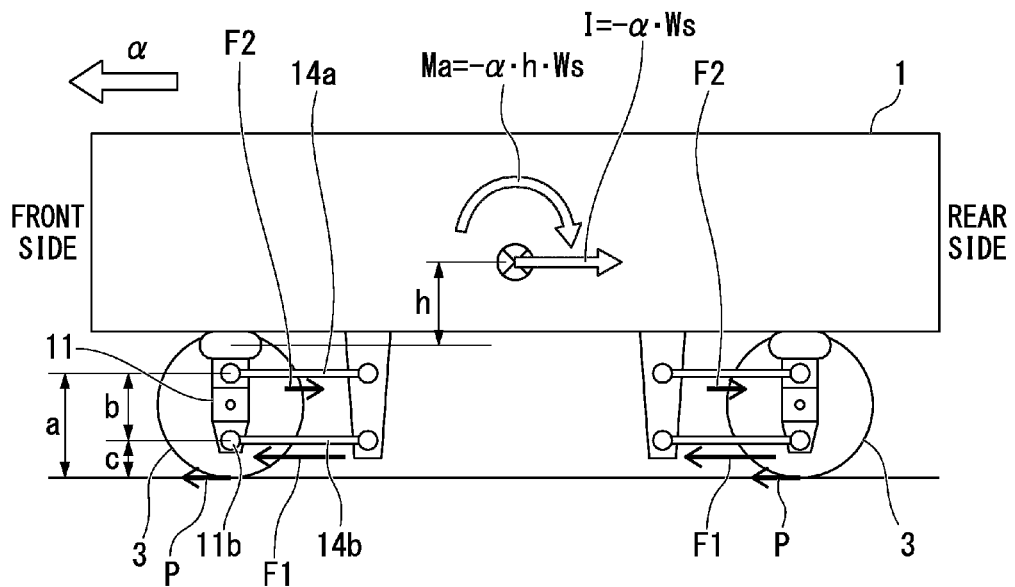
FIG. 4A is a view for describing a force and a moment applied to the respective parts of a vehicle during acceleration of the vehicle of the related art.
Figure 4B:
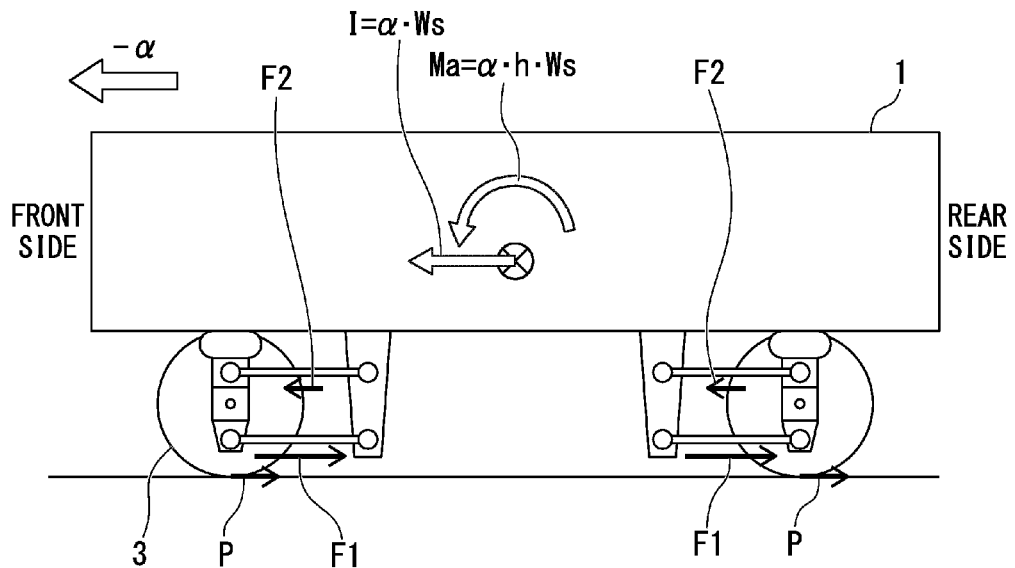
FIG. 4B is a view for describing a force and a moment applied to the respective parts of a vehicle during deceleration of the vehicle of the related art.

First, as a reference example, in the travel device of the related art in which the upper link 14a and the lower link 14b are parallel to each other and both extend in the horizontal direction, an inertial moment applied to the vehicle body will be described with reference to FIG. 4A and FIG. 4B. In addition, FIG. 4A shows a state upon acceleration, and FIG. 4B shows a state upon deceleration.

An inertial force I applied to the vehicle body 1 when the vehicle accelerates forward at an acceleration $\alpha$ is represented by the following equation.

$$I = -\alpha \cdot Ws$$

Ws: vehicle body weight (not including the travel device)

In addition, a reactive force P applied to the ground section of the running tire 3 at this time is represented by the following equations.

$$P = \alpha \cdot Wo \text{ (in the case of one-axis drive)}$$

$$P = \alpha \cdot Wo/2 \text{ (in the case of two-axis drive)}$$

Further, when the reactive force P is applied to the ground section of the running tire 3, a force F2 applied to the upper link 14a is represented as in the following equation from a balance of the reactive force P and the moment with respect to the position 11b when the lower link 14b and the axle bearing 13 are connected by pin coupling.

$$F2 = -P \cdot c/b (\because c \cdot P = -F2 \cdot b)$$

b: distance between position at which upper link and bogie frame main body are connected by pin coupling and position at which lower link and axle bearing are connected by pin coupling c: distance between position at which lower link and axle bearing are connected by pin coupling and ground plane In addition, when the reactive force P is applied to the ground section of the running tire 3, a force F1 applied to the lower link 14b is represented by the following equation from a balance between the force F1, the force F2 applied to the upper link 14a, and the reactive force P.

$$F1 = P \cdot \alpha/b$$

$$(\because P = F1 + F2, F1 = -F2 + P = P \cdot c/b + P \cdot b/b = P \cdot (c+b)/b)$$

a: distance between position at which upper link and bogie frame main body are connected by pin coupling and ground plane In addition, an inertial moment Ma generated by the inertial force I applied to the vehicle body 1 is represented by the following equation.

$$Ma = I \cdot h = (-\alpha \cdot Ws) \cdot h = -\alpha \cdot h \cdot Ws$$

h: distance between intermediate point of air suspension and center of vehicle body in the vertical directions When the vehicle accelerates forward, the inertial moment Ma ($=-\alpha \cdot h \cdot Ws$) represented as in the above equation, i.e., the inertial moment Ma in a clockwise direction shown in FIG. 4A is applied to the vehicle body 1. As a result, the front portion of the vehicle body 1 is raised, and the rear portion of the vehicle body 1 is lowered.

In addition, the inertial force I applied to the vehicle body 1 when the vehicle decelerates forward at the acceleration $\alpha$, i.e., accelerates forward at the acceleration ($-\alpha$), is represented by the following equation.

$$I = \alpha \cdot Ws$$

Further, the reactive force P applied to the ground section of the running tire 3 at this time is represented by the following equations.

$$P = -\alpha \cdot Wo \text{ (in the case of one-axis drive)}$$

$$P = -\alpha \cdot Wo/2 \text{ (in the case of two-axis drive)}$$

Furthermore, when the reactive force P is applied to the ground section of the running tire 3, the force F2 applied to the upper link 14a is represented by the following equation.

$$F2 = P \cdot c/b$$

In addition, when the reactive force P is applied to the ground section of the running tire 3, the force F1 applied to the lower link 14b is represented by the following equation.

$$F1 = -P \cdot a/b$$

Further, the inertial moment Ma generated by the inertial force I applied to the vehicle body 1 is represented by the following equation.

$$Ma = I \cdot h = (\alpha \cdot Ws) \cdot h = \alpha \cdot h \cdot Ws$$

When the vehicle decelerates forward, the inertial moment Ma ($=\alpha \cdot h \cdot Ws$) represented as in the above equation, that is, the inertial moment Ma in the counterclockwise direction of FIG. 4B, is applied to the vehicle body 1. As a result, the front portion of the vehicle body 1 is lowered, and the rear portion of the vehicle body 1 is raised.

Next, in the travel device of the embodiment, the inertial moment applied to the vehicle body will be described using FIG. 3A and FIG. 3B. In addition, FIG. 3A shows a state of acceleration, and FIG. 3B shows a state of deceleration.

When the vehicle accelerates forward at the acceleration $\alpha$, since the component of force in the horizontal direction of the force applied to the upper link 14a inclined with respect to the horizontal direction at the inclination angle $\theta$ is the same as the force F2 applied to the upper link 14a in the travel device of the related art, a component of force F2t in the vertical direction of the force applied to the upper link 14a is represented by the following equation.

$$F2t = F2 \cdot \tan\theta = (-P \cdot c/b) \cdot \tan\theta$$

In addition, here, since the component of force in the horizontal direction of the force applied to the lower link 14b inclined with respect to the horizontal direction at the inclination angle $\theta$ is the same as the force F1 applied to the lower link 14b in the travel device of the related art, the component of force F1t in the vertical direction applied to the lower link 14b is represented by the following equation.

$$F1t = F1 \cdot \tan\theta = (P \cdot a/b) \cdot \tan\theta$$

Both of the components of forces F1t and F2t in the vertical direction applied to the links 14a and 14b are applied to the vehicle body 1 as a moment. The moment, i.e., a tire reactive force moment Mt, is represented by the following equation.

$$Mt = (F1t + F2t) \cdot B$$
$$= [(P \cdot a/b) \cdot \tan\theta + (-P \cdot c/b) \cdot \tan\theta] \cdot B$$
$$= [(a-c)/b] \cdot P \cdot B \cdot \tan\theta$$
$$= P \cdot B \cdot \tan\theta \; (\because b = a - c)$$

B: distance between support section of suspension frame of front side travel device and support section of suspension frame of rear side travel device Accordingly, in the embodiment, when the vehicle accelerates, since the tire reactive force moment Mt ($=P \cdot B \cdot \tan\theta$) acts in the counterclockwise direction and negates the inertial moment Ma ($=-\alpha \cdot h \cdot Ws$) in the clockwise direction, in which the vehicle body 1 is inclined in the forward and rearward direction, inclination of the vehicle body 1 upon acceleration can be suppressed. Accordingly, in the embodiment, the ride quality upon acceleration can be improved.

In addition, when the vehicle decelerates forward at the acceleration $\alpha$, since the component of force in the horizontal direction of the force applied to the upper link 14a inclined with respect to the horizontal direction at the inclination angle $\theta$ is the same as the force F2 applied to the upper link 14a of the travel device of the related art, the component of force F2t in the vertical direction of the force applied to the upper link 14a is represented by the following equation (3).

$$F2t = F2 \cdot \tan\theta = (P \cdot c/b) \cdot \tan\theta$$

Further, here, since the component of force in the horizontal direction of the force applied to the lower link 14b inclined with respect to the horizontal direction at the inclination angle $\theta$ is the same as the force F1 applied to the lower link 14b of the travel device of the related art, the component of force F1t in the vertical direction applied to the lower link 14b is represented by the following equation.

$$F1t = F1 \cdot \tan\theta = (-P \cdot a/b) \cdot \tan\theta$$

Both of the components of forces F1t and F1t in the vertical direction of the force applied to the links 14a and 14b are applied to the vehicle body 1 as a moment, like that upon acceleration. The moment, i.e., the tire reactive force moment Mt, is represented by the following equation.

$$Mt = (F1t + F2t) \cdot B$$
$$= [(-P \cdot a/b) \cdot \tan\theta + (P \cdot c/b) \cdot \tan\theta] \cdot B$$
$$= [(-a+c)/b] \cdot P \cdot B \cdot \tan\theta$$
$$= -P \cdot B \cdot \tan\theta (\because b = a - c)$$

Accordingly, in the embodiment, when the vehicle decelerates, the tire reactive force moment Mt (=–P·B·tan θ) acts in the clockwise direction and negates the inertial moment Ma (=α·h·Ws) in the counterclockwise direction, in which the vehicle body 1 is inclined in the forward and rearward direction. For this reason, inclination of the vehicle body 1 upon deceleration can be suppressed.

Hereinabove, in the embodiment, upon acceleration and deceleration of the vehicle, since not only the inertial moment Ma for inclining the vehicle body 1 in the forward and rearward direction but also the tire reactive force moment Mt in a direction negating the inertial moment Ma are applied to the vehicle body 1, inclination of the vehicle body 1 upon acceleration and deceleration of the vehicle can be suppressed.

Specifically, upon acceleration at the acceleration α, in the travel device in which the inclination angle θ of the link is 0°, i.e., in the travel device of the related art, a raising amount of the front portion of the vehicle body 1 is 10 mm, in the travel device of the embodiment in which the inclination angle θ of the link is set to 10°, even in the one-axis drive, the raising amount of the front portion of the vehicle body 1 is reduced by half to 5 mm or less, and in the case of two-axis drive, the raising amount of the front portion of the vehicle body 1 is further reduced, largely suppressing inclination of the vehicle body 1.

In addition, the inclination angles θ of the upper link 14a and the lower link 14b with respect to the horizontal direction may be basically, as will be described below, 5° or more and 15° or less.

$$5° \leq \theta \leq 15°$$

When the inclination angle θ is less than 5°, the tire reactive force moment Mt is small, and an effect of negating the inertial moment Ma cannot be expected. For this reason, the inclination angle θ may be 5° or more. In addition, when the inclination angle θ exceeds 15°, a movement amount in the forward and rearward direction and relative movement in the vertical direction of the running tire 3, the axle 5 and the bogie frame 11 with respect to the suspension frame 15 are increased, and thus an unnecessary load applied to the position at which the links 14a and 14b are connected by pin coupling is increased. For this reason, the inclination angle θ may be 15° or less.

Second Embodiment

Next, a second embodiment of the travel device of the vehicle according to the present invention will be described with reference to FIG. 5A and FIG. 5B.

Figure 5A:
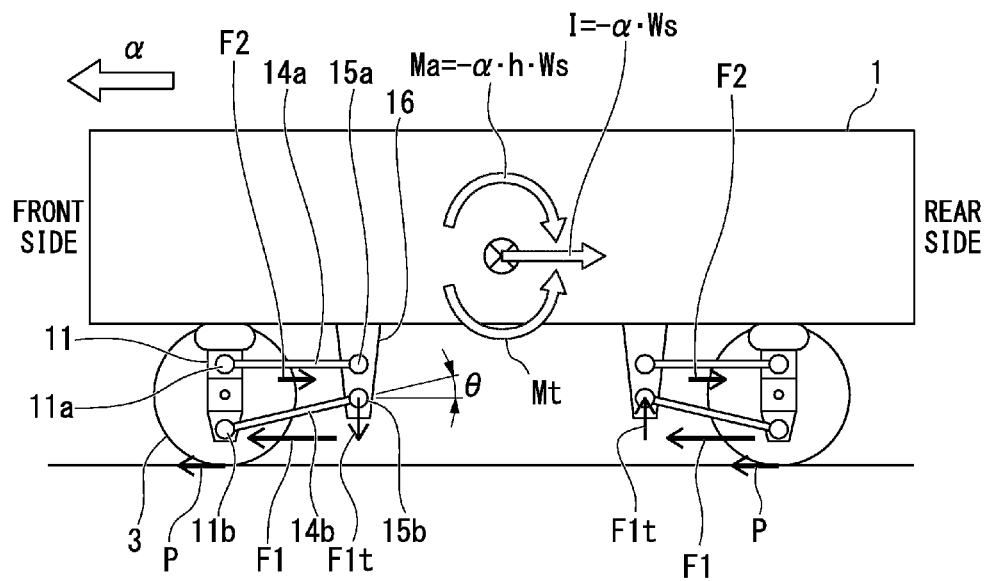
FIG. 5A is a view for describing a force and a moment applied to the respective parts of a vehicle during acceleration of the vehicle according to a second embodiment of the present invention.
Figure 5B:
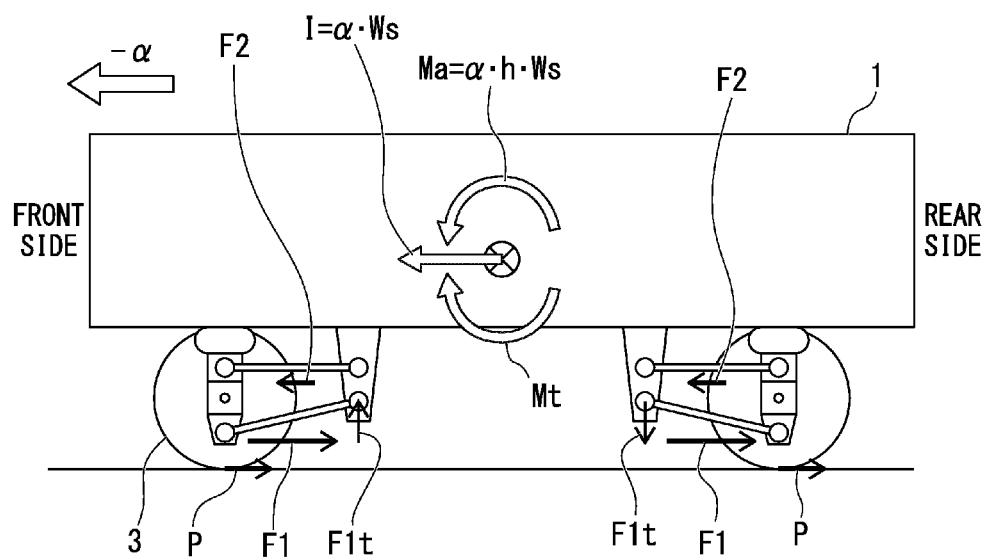
FIG. 5B is a view for describing a force and a moment applied to the respective parts of the vehicle during deceleration of the vehicle according to the second embodiment of the present invention.

In addition, FIG. 5A shows a state of acceleration, and FIG. 5B shows a state of deceleration.

The travel device of the embodiment is basically the same as the travel device of the first embodiment, except that a position at which the upper link 14a is connected by pin coupling is different. Accordingly, hereinafter, differences from the first embodiment will be mainly described.

Similar to the first embodiment, the lower link 14b of the embodiment is installed to be inclined with respect to the horizontal direction at the inclination angle θ such that the position 11b at which the lower link 14b and the bogie frame 11 are connected by pin coupling is disposed lower in the vertical direction than the position 15b at which the lower link 14b and the support section 16 of the suspension frame 15 are connected by pin coupling. Meanwhile, in the upper link 14a of the embodiment, the position 11a at which the upper link 14a and the bogie frame 11 are connected by pin coupling and the position 15a at which the upper link 14a and the support section 16 are connected by pin coupling are the same position in the vertical direction. That is, the upper link 14a extends in the horizontal direction, and the inclination angle is set to 0°. In addition, both of the inclination angles (here, 0°) of the upper link 14a and the inclination angle θ of the lower link 14b are values when the vehicle is in a state in which there is no passenger.

Next, in the travel device of the embodiment, an inertial moment applied to the vehicle body will be described.

When the vehicle accelerates forward at the acceleration α, a component of force F2t in a vertical direction of the force applied to the upper link 14a extending in the horizontal direction is 0.

In addition, here, the component of force F1t in the vertical direction of the force applied to the lower link 14b inclined with respect to the horizontal direction at the inclination angle θ is the same as in the first embodiment and represented by the following equation.

$$F1t = F1 \cdot \tan\theta = (P \cdot a/b) \cdot \tan\theta$$

The component of force F1t in the vertical direction of the force applied to the lower link 14b is applied to the vehicle body 1 as a moment. The moment, i.e., a tire reactive force moment Mt, is represented by the following equation.

$$Mt = F1t \cdot B$$
$$= [(P \cdot a/b) \cdot \tan\theta] \cdot B$$
$$= (a/b) \cdot P \cdot B \cdot \tan\theta$$

Accordingly, in the embodiment, when the vehicle accelerates, since the tire reactive force moment Mt (=(a/b)·P·B·tan θ) acts in the counterclockwise direction and negates the inertial moment Ma (=–α·h·Ws) in the clockwise direction, in which the vehicle body 1 is inclined in the forward and rearward direction, inclination of the vehicle body 1 during acceleration can be suppressed. Accordingly, even in the embodiment, a ride quality during acceleration can be improved.

When the vehicle decelerates forward at the acceleration α, a component of force F1t in the vertical direction applied to the upper link 14a extending in the horizontal direction is the same as upon acceleration, i.e., 0.

In addition, here, the component of force F1t in the vertical direction of the force applied to the lower link 14b inclined with respect to the horizontal direction at the inclination angle θ is the same as in the first embodiment, and is represented by the following equation.

$$F1t = F1 \cdot \tan\theta = (-P \cdot a/b) \cdot \tan\theta$$

The component of force F1t in the vertical direction of the force applied to the lower link 14b is the same as upon acceleration, and is applied to the vehicle body 1 as a moment. The moment, i.e., the tire reactive force moment Mt, is represented by the following equation.

$$Mt = F1t \cdot B$$
$$= [(-P \cdot a/b) \cdot \tan\theta] \cdot B$$
$$= (a/b) \cdot P \cdot B \cdot \tan\theta$$

Accordingly, in the embodiment, when the vehicle decelerates, the tire reactive force moment Mt $(=-(a/b)\cdot P\cdot B\cdot \tan\theta)$ acts in the clockwise direction and negates the inertial moment Ma $(=\alpha\cdot h\cdot Ws)$ in the counterclockwise direction, in which the vehicle body 1 is inclined in the forward and rearward direction, and thus inclination of the vehicle body 1 during deceleration can be suppressed.

Hereinabove, even in the embodiment, during acceleration and deceleration of the vehicle, not only the inertial moment Ma for inclining the vehicle body 1 in the forward and rearward direction but also the tire reactive force moment Mt in a direction negating the inertial moment Ma are applied to the vehicle body 1. For this reason, inclination of the vehicle body 1 during acceleration and deceleration of the vehicle can be suppressed.

In addition, in the embodiment, when the inclination angle θ is the same as in the first embodiment, since the tire reactive force moment Mt $(=(a/b)\cdot P\cdot B\cdot \tan\theta\ (a/b>1))$ is larger than the tire reactive force moment Mt $(=P\cdot B\cdot \tan\theta)$ of the first embodiment, inclination of the vehicle body 1 during acceleration can be suppressed.

However, in the embodiment, as will be described below, the inclination angle θ of the lower link 14b may be 3° or more and 10° or less.

When the inclination angle θ is less than 3°, the tire reactive force moment Mt is small, and an effect of negating the inertial moment Ma cannot be expected. For this reason, the inclination angle θ may be 3° or more. In addition, when the inclination angle θ exceeds 10°, the bogie frame 11 is inclined. For this reason, the inclination angle θ may be 10° or less. This is because, when the running tire 3, the axle 5 and the bogie frame 11 relatively move with respect to the suspension frame 15 in the vertical direction, a relative movement amount of the lower portion of the bogie frame 11 connected to the inclined lower link 14b by pin coupling in the forward and rearward direction is larger than a relative movement amount in the forward and rearward direction of the upper portion of the bogie frame 11 connected to the upper link 14a extending in the horizontal direction by pin coupling.

In addition, in the embodiment, while the upper link 14a is not inclined, the upper link 14a may be inclined within a range of the inclination angle θ of the lower link 14b. In other words, the upper link 14a may be inclined such that the position 11a at which the upper link 14a and the bogie frame 11 are connected by pin coupling is disposed lower than the position 15a at which the upper link 14a and the support section 16 of the suspension frame 15 are connected by pin coupling in the vertical direction by a range of the vertical reference distance d.

In addition, while both of the above-mentioned embodiments are examples in which the present invention is applied to the vehicle of the new transportation system of the side guide track-type, the present invention is not limited thereto. For example, the above-mentioned embodiments may be applied to a vehicle of a new transportation system of a center guide track-type, or may be applied to another vehicle.

INDUSTRIAL APPLICABILITY

According to the present invention, inclination of the vehicle body in the forward and rearward direction during acceleration and deceleration can be suppressed, and the ride quality can be improved.

DESCRIPTION OF REFERENCE NUMERALS 1 vehicle body
3 running tire (wheel)
5 axle
10 suspension system
11 bogie frame (axle support)
13 axle bearing (of axle support)
14a upper link
14b lower link
15 suspension frame
16 support section (of suspension frame)
17 attachment (of suspension frame)
19 air suspension
11a pin coupling position (between bogie frame and upper link)
11b pin coupling position (between bogie frame and lower link)
15a pin coupling position (between support section of suspension frame and upper link)
15b pin coupling position (between support section of suspension frame and lower link)
20 steering guide device

The invention claimed is:

1. A travel device of a vehicle disposed at a front side and a rear side of a lower portion of a vehicle body, the travel device comprising:
an axle support configured to support an axle to which wheels are attached;
a suspension frame including a hanging section disposed close to a center of the vehicle body with reference to the axle support and extending downward from the vehicle body; and
a link configured to connect the hanging section and the axle support and in which the axle support is movable with respect to the hanging section in a vertical direction, wherein
the link has a lower link configured to be connected to the hanging section and the axle support by pin coupling, and an upper link disposed over the lower link and configured to be connected to the hanging section and the axle support by pin coupling,
in the lower link, a pin coupling position between the lower link and the axle support is disposed lower than a pin coupling position between the lower link and the hanging section of the suspension frame in the vertical direction,
when a distance in the vertical direction from the pin coupling position between the lower link and the hanging section to the pin coupling position between the lower link and the axle support is a vertical reference distance, in the upper link, a pin coupling position between the upper link and the axle support is disposed lower than a pin coupling position between the upper link and the hanging section of the suspension frame in the vertical direction at the vertical reference distance, and
the pin coupling position between the lower link and the axle support, the pin coupling position between the upper link and the axle support, and the axle are arranged to be aligned on a straight line in the vertical direction.

2. A vehicle comprising:
the vehicle body; and
a travel device according to claim 1.

3. A travel device according to claim 1, wherein inclination angles of the upper link and the lower link with respect to a horizontal direction are 5° or more and 15° or less.

4. A travel device according to claim 1, wherein a distance between the axle support and a center of the vehicle body is greater than a distance between the hanging section and the center of the vehicle body.

* * * * *